US008696797B2

(12) United States Patent
Steele

(10) Patent No.: US 8,696,797 B2
(45) Date of Patent: Apr. 15, 2014

(54) CARBON DIOXIDE REMOVAL FROM SYNTHESIS GAS AT ELEVATED PRESSURE

(75) Inventor: Raymond Douglas Steele, Houston, TX (US)

(73) Assignee: General Electric Company, Schenectady, NY (US)

(*) Notice: Subject to any disclaimer, the term of this patent is extended or adjusted under 35 U.S.C. 154(b) by 942 days.

(21) Appl. No.: 12/130,297

(22) Filed: May 30, 2008

(65) Prior Publication Data

US 2009/0293723 A1  Dec. 3, 2009

(51) Int. Cl.
*B01D 53/14* (2006.01)
(52) U.S. Cl.
USPC .......... 95/172; 95/192; 95/208; 95/227; 95/228; 95/235; 95/236; 423/228
(58) Field of Classification Search
USPC .......... 423/210–248; 95/149–240, 241–266; 96/243–371, 155–220, 234–241
See application file for complete search history.

(56) References Cited

U.S. PATENT DOCUMENTS

| | | | |
|---|---|---|---|
| 4,224,144 A | | 9/1980 | Hensley, Jr. et al. |
| 4,397,660 A | * | 8/1983 | Van der Pas-Toornstra .... 95/162 |
| 4,553,984 A | * | 11/1985 | Volkamer et al. ............... 95/177 |
| 4,702,898 A | * | 10/1987 | Grover ........................... 423/220 |
| 5,724,922 A | * | 3/1998 | Agata ............................ 122/459 |
| 6,511,640 B1 | * | 1/2003 | Kumar et al. ................... 423/210 |
| 6,602,326 B2 | * | 8/2003 | Lee et al. ......................... 95/153 |
| 6,664,944 B1 | * | 12/2003 | Albert et al. ................... 345/107 |
| 6,720,359 B2 | * | 4/2004 | O'Rear et al. .................. 518/702 |
| 6,767,527 B1 | * | 7/2004 | Åsen et al. ................... 423/437.1 |
| 6,805,728 B2 | * | 10/2004 | Sweeney et al. ................. 95/133 |
| 7,074,324 B2 | | 7/2006 | Feimer et al. |
| 7,314,503 B2 | | 1/2008 | Landrum et al. |
| 2004/0109801 A1 | | 6/2004 | Otsuka et al. |
| 2006/0110305 A1 | | 5/2006 | Van de Graaf |
| 2006/0162559 A1 | * | 7/2006 | Asprion et al. ................. 95/235 |
| 2007/0077188 A1 | * | 4/2007 | Katz et al. ..................... 423/220 |
| 2007/0148068 A1 | | 6/2007 | Burgers et al. |
| 2007/0283812 A1 | | 12/2007 | Liu et al. |
| 2008/0056971 A1 | | 3/2008 | Hughes |

FOREIGN PATENT DOCUMENTS

| | | |
|---|---|---|
| DE | 102004050936 A1 | 4/2006 |
| EP | 0768365 A1 | 4/1997 |
| EP | 768365 A1 * | 4/1997 |
| WO | 2004052511 A1 | 6/2004 |

(Continued)

OTHER PUBLICATIONS

M.S. Dupart, T.R. Bacon, D.J. Edwards, Understanding Corrosion in Alanolamine Gas Treating Plants, 1993, HydroCarbon Processing, pp. 75-80.*

(Continued)

*Primary Examiner* — Duane Smith
*Assistant Examiner* — Thomas McKenzie
(74) *Attorney, Agent, or Firm* — Armstrong Teasdale LLP

(57) ABSTRACT

A method for removing $CO_2$ from a pressurized gas stream with the effluent $CO_2$ remaining at system pressure or higher is disclosed. Specifically, the removal method provides near isothermal absorption of $CO_2$ from a gas stream in a suitable solvent at an elevated pressure and relatively low temperature. The solvent is then removed from contact with the gas stream, and the temperature is increased to such an extent that the $CO_2$ will flash from the solvent.

16 Claims, 4 Drawing Sheets

(56) References Cited

FOREIGN PATENT DOCUMENTS

| WO | 2007068695 A1 | 6/2007 |
| WO | 2007146610 A2 | 12/2007 |
| WO | 2008009049 A1 | 1/2008 |

OTHER PUBLICATIONS

Webster's Ninth New Collegiate Dictionary, 1986.*

Kohl and Nielsen, Gas Purification, Gulf Publishing Co., 1997, pp. 40-56.

Unknown, PCT International Search Report regarding PCT/US2009/041509, Sep. 29, 2009, 4 pgs., International Searching Authority, Netherlands.

* cited by examiner

CARBON DIOXIDE REMOVAL FROM SYNTHESIS GAS AT ELEVATED PRESSURE

BACKGROUND OF THE DISCLOSURE

This disclosure relates generally to pressurized gas systems, such as gasification systems used in an integrated gasification combined-cycle (IGCC) power generation plant, from which it is desired to recover carbon dioxide with a minimal decrease in pressure in the carbon dioxide. More particularly, the disclosure relates to improved methods of removing carbon dioxide ($CO_2$) from synthesis gas streams produced using an IGCC power generation plant.

Most known IGCC plants include a gasification system that is integrated with at least one power-producing turbine system. For example, at least some known gasification systems convert a mixture of fuel; air or oxygen; steam, water and/or $CO_2$ into a synthesis gas, or "syngas." The syngas is channeled to the combustor of a gas turbine engine, which powers an electrical generator that supplies electrical power to a power grid. Exhaust from at least some known gas turbine engines is supplied to a heat recovery steam generator (HRSG) that generates steam for driving a steam turbine. Power generated by the steam turbine also drives an electrical generator that provides electrical power to the power grid.

In recent years, there has been a growing concern related to greenhouse gas emissions, particularly, $CO_2$. At least some known gasification systems associated with IGCC plants typically produce a "raw" syngas fuel which includes carbon monoxide (CO), hydrogen ($H_2$), carbon dioxide ($CO_2$), carbonyl sulfide (COS), and hydrogen sulfide ($H_2S$). The $CO_2$, $H_2S$, and COS are typically referred to as acid gases. IGCC technology per se involves the potential of high efficiency, thus reducing the $CO_2$ output accordingly. Moreover, $H_2S$ and COS, generated with the use of IGCC plants, are generally removed from the raw syngas fuel to produce a "clean" syngas fuel for combustion within the gas turbine engines. Such acid gas removal is performed with an acid gas removal subsystem that typically includes at least one clean-up system to remove a majority of $H_2S$ and/or COS.

Conventionally, provisions are only made for removing COS and $H_2S$ in an IGCC plant. More particularly, the $H_2S$ is removed by solvent processes such as amine solvent removal or physical solvent removal, which produces $H_2S$ at low pressure. The sulfur can then further be recovered. Similar procedures can be used for COS, however, these processes are typically not as efficient and as such may require a hydration step that converts COS to $H_2S$ prior to using a solvent.

With the requirements for mitigation of $CO_2$ being introduced into the atmosphere, conventional removal processes are not adequate. Accordingly, there is a need to modify or replace the conventional acid gas removal (AGR) systems to recover $CO_2$ for sequestration or deposition as a product. One method that has been suggested for $CO_2$ recovery, is to modify the solvent based technologies currently used to facilitate the recovery of both $CO_2$ and $H_2S$ in sequential units, or by developing an integrated $CO_2/H_2S$ AGR system. One disadvantage of such a system of this type is that the acid gases including $CO_2$ are recovered at low pressure. Carbon dioxide, however, must be supplied at elevated pressures for recycling to the gasifier, sequestration, deposition, pipelining and the like. As such, $CO_2$ removed from an integrated system would require compression prior to ultimate use in the IGCC plant that will be costly and inefficient.

As such, there is a need in the art for the development of a less expensive and more effective removal method for removing and recovering $CO_2$ from gas streams, such as synthesis gas streams, at elevated pressures. More specifically, there is a need for an alternative means of removing $CO_2$ from syngas without the need for compression of the $CO_2$ before sequestration or other deposition. Additionally, it would be advantageous if the energy requirements of removal could be reduced by the removal method.

BRIEF DESCRIPTION OF THE DISCLOSURE

The present disclosure relates to a method for removing $CO_2$ from gas streams, such as syngas streams, with the effluent $CO_2$ remaining an elevated pressure in order to avoid the capital and operating expenses of compression. Specifically, the removal method provides near isothermal absorption of $CO_2$ from the gas stream in a suitable solvent at an elevated pressure and relatively low temperature. The solvent is then removed from contact with the gas stream, and the temperature is increased to such an extent that the $CO_2$ will flash from the solvent at the elevated pressure. The solvent is then cooled and returned to the adsorption cycle, with the $CO_2$ in the flash gas available at elevated pressure.

As such, the present disclosure is directed to a method of removing carbon dioxide from a gas stream, the method comprising: absorbing carbon dioxide from the gas stream using a solvent in a liquid gas contactor to form an acid gas rich-solvent, the solvent being capable of absorbing carbon dioxide at a low temperature and an inlet pressure of the gas stream into the liquid gas contactor; introducing the acid gas rich solvent into a heating train and heating the acid gas rich solvent; flashing the heated acid gas rich-solvent to form a flash gas stream and a hot lean solvent, wherein the flash gas stream is rich in carbon dioxide; cooling the hot lean solvent to form a cooled lean solvent; and recycling the cooled lean solvent into the liquid gas contactor.

The present disclosure is further directed to a method of removing carbon dioxide from a gas stream, the method comprising: removing sulfur-containing compounds from the gas stream to form a sulfur-lean gas stream; then absorbing carbon dioxide from the sulfur-lean gas stream using a solvent in a liquid gas contactor to form an acid gas rich-solvent, the solvent being capable of absorbing carbon dioxide at a relatively low temperature and at the inlet pressure of the sulfur-lean gas stream in the liquid gas contactor; introducing the acid gas rich solvent into a heating train and heating the acid gas rich-solvent; flashing the heated acid gas rich-solvent to form a flash gas stream and a hot lean solvent, wherein the flash gas stream is rich in carbon dioxide; cooling the hot lean solvent to form a cooled lean solvent; and recycling the cooled lean solvent back into the liquid gas contactor.

The present disclosure is further directed to a method of removing carbon dioxide and hydrogen sulfur from a gas stream, the method comprising: absorbing carbon dioxide and hydrogen sulfur from the gas stream using a solvent in a liquid gas contactor to form an acid gas rich-solvent, the solvent being capable of absorbing carbon dioxide and hydrogen sulfur at a relatively low temperature and at the inlet pressure of the gas stream in the liquid gas contactor; introducing the acid gas rich solvent into a heating train and heating the acid gas rich-solvent; flashing the heated acid gas rich-solvent to form a flash gas stream and a hot lean solvent, wherein the flash gas stream is rich in carbon dioxide and hydrogen sulfur; cooling the hot lean solvent to form a cooled lean solvent; and recycling the cooled lean solvent back into the liquid gas contactor. The liquid gas contactor may be provided with appropriate intercooling to provide near isothermal operation.

Other objects and features will be in part apparent and in part pointed out hereinafter.

DETAILED DESCRIPTION OF THE DISCLOSURE

The present disclosure relates to a method for removing $CO_2$ from pressurized gas streams. This removal method is conducted at elevated pressures (e.g., system pressures or higher), thereby eliminating the necessity of compressing the $CO_2$ required of conventional technologies, resulting in reduced capital and operating costs.

While described herein, $CO_2$ is removed from a syngas stream produced in an IGCC plant, however, one skilled in the art should recognize that the method of the present disclosure can be utilized to remove $CO_2$ from any of a various number of different pressurized gas streams. Accordingly, the present disclosure should not be limited solely to removing $CO_2$ from syngas.

Figure 1:
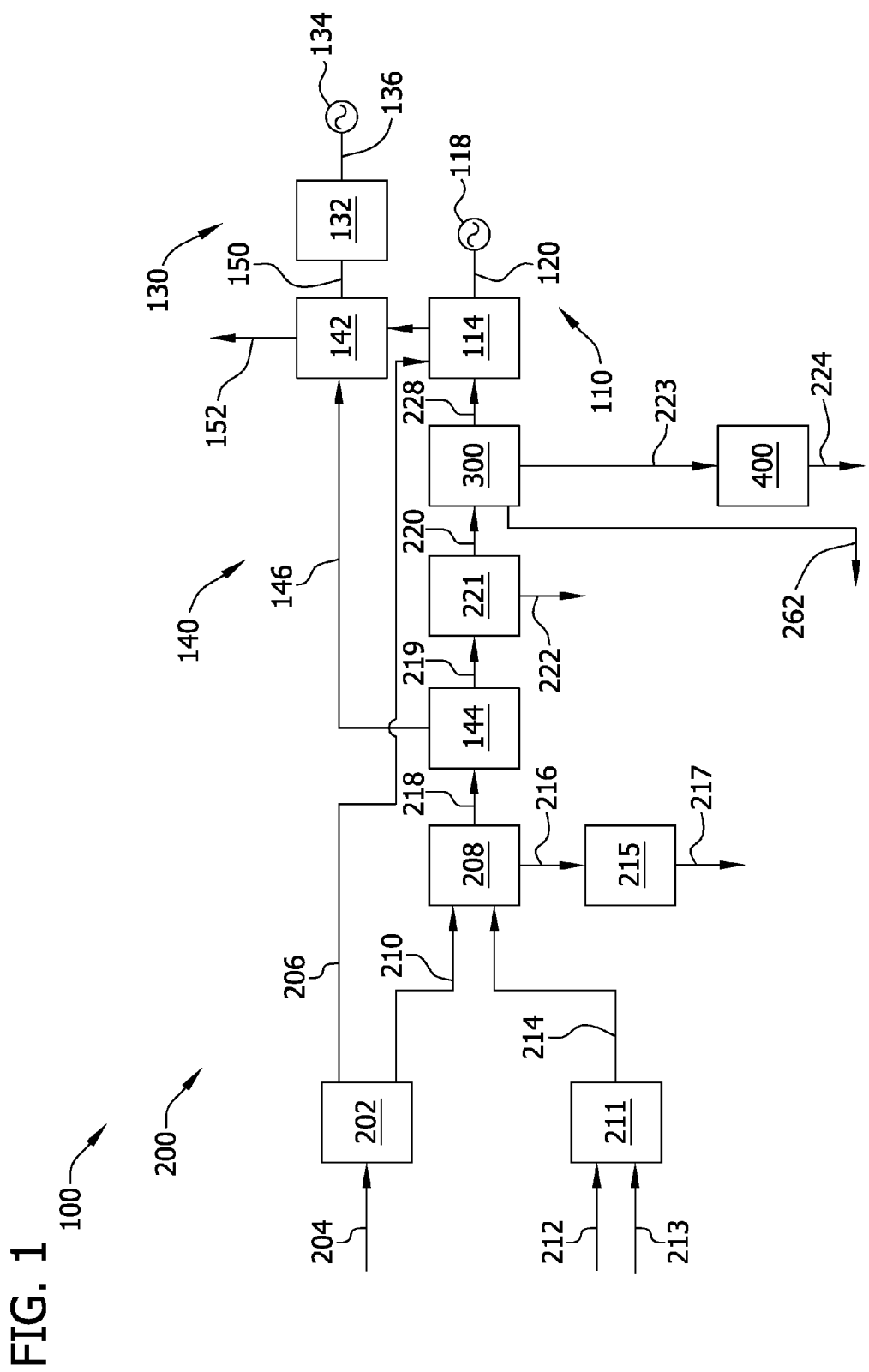
FIG. 1 is a schematic diagram of an exemplary integrated gasification combined-cycle (IGCC) power generation plant.

FIG. 1 is a typical schematic diagram of an exemplary integrated gasification combined-cycle (IGCC) power generation plant 100. It should be understood that IGCC plant 100 may contain numerous additional elements or different elements from that shown. In the exemplary embodiment, IGCC plant 100 includes gas turbine engine 110 including gas turbine 114. Gas turbine 114 is rotatably coupled to first electrical generator 118 via first rotor 120. Gas turbine 114 is coupled in flow communication with at least one fuel source and at least one air source (both described in more detail below) and is configured to receive the fuel and air from the fuel source and the air source, respectively. Gas turbine 114 is configured to mix air and fuel, produce hot combustion gases (not shown), and convert the heat energy within the gases to rotational energy. The rotational energy is transmitted to first electrical generator 118 via first rotor 120, wherein first electrical generator 118 is configured to facilitate converting the rotational energy to electrical energy (not shown) for transmission to at least one load, including, but not limited to, an electrical power grid (not shown).

IGCC plant 100 also includes a steam turbine engine 130. In the exemplary embodiment, steam turbine engine 130 includes steam turbine 132 rotatably coupled to second electrical generator 134 via second rotor 136.

IGCC plant 100 further includes steam generation system 140. In the exemplary embodiment, steam generation system 140 includes at least one heat recovery steam generator (HRSG) 142 that is coupled in flow communication with at least one heat transfer apparatus 144 via at least one heated boiler feedwater conduit 146. HRSG 142 is configured to receive boiler feedwater (not shown) from heat transfer apparatus 144 via conduit 146 for facilitating heating the boiler feedwater into steam. Additional steam can be generated in heat transfer apparatus 144 itself and then fed into HRSG 142. HRSG 142 is also configured to receive exhaust gases (not shown) from gas turbine 114 via an exhaust gas conduit (not shown) to further facilitate heating the boiler feedwater into steam. HRSG 142 is coupled in flow communication with steam turbine 132 via steam conduit 150. Combustion gasses are exhausted from HRSG 142 to the atmosphere via stack gas conduit 152.

Conduit 150 is configured to channel steam (not shown) from HRSG 142 to steam turbine 132. Steam turbine 132 is configured to receive the steam from HRSG 142 and convert the thermal energy in the steam to rotational energy. The rotational energy is transmitted to second electrical generator 134 via second rotor 136, wherein second electrical generator 134 is configured to facilitate converting the rotational energy to electrical energy (not shown) for transmission to at least one load, including, but not limited to, the electrical power grid. The steam is condensed and returned as boiler feedwater via a condensate conduit (not shown).

IGCC plant 100 also includes a gasification system 200. In the exemplary embodiment, gasification system 200 includes at least one air separation unit 202 coupled in flow communication with an air source via an air conduit 204. The air sources include, but are not limited to, dedicated air compressors and compressed air storage units (not shown). Air separation unit 202 is configured to separate air into oxygen ($O_2$), nitrogen ($N_2$) and other components (neither shown). The other components are retained in the gas stream. $N_2$ is either channeled to gas turbine 114 via $N_2$ conduit 206 to control combustion or vented to the atmosphere.

Gasification system 200 includes gasifier 208 that is coupled in flow communication with air separation unit 202 and is configured to receive the $O_2$ channeled from air separation unit 202 via $O_2$ conduit 210. Gasification system 200 also includes coal grinding and slurrying unit 211. Coal grinding and slurrying unit 211 is coupled in flow communication with coal source and water source (neither shown) via a coal supply conduit 212 and a water supply conduit 213, respectively. Coal grinding and slurrying unit 211 is configured to mix the coal and water to form a coal slurry stream (not shown) that is channeled to gasifier 208 via coal slurry conduit 214.

Gasifier 208 is configured to receive the coal slurry stream and an $O_2$ stream via conduits 214 and 210, respectively. Gasifier 208 is also configured to facilitate production of a hot, raw syngas stream (not shown). The raw syngas includes carbon monoxide (CO), hydrogen ($H_2$), carbon dioxide ($CO_2$), carbonyl sulfide (COS), and hydrogen sulfide ($H_2S$). While $CO_2$, COS, and $H_2S$ are typically collectively referred to as acid gases, or acid gas components of the raw syngas, hereon, $CO_2$ (and, to some extent, $H_2S$) will be discussed separately from the remaining acid gas components. Moreover, gasifier 208 is also configured to produce a slag stream (not shown) composed of the ash from the coal, and further, lesser quantities of carbon, as a by-product of the syngas production. The slag stream is channeled to slag handling unit 215 via slag conduit 216. Slag handling unit 215 is configured to quench and break up the slag into small slag pieces wherein a slag removal stream is produced and channeled through conduit 217.

Gasifier 208 is coupled in flow communication with heat transfer apparatus 144 via hot syngas conduit 218. Heat transfer apparatus 144 is configured to receive the hot, raw syngas stream and transfer at least a portion of the heat in the form of steam to steam turbine 132 via conduits 146 and 150. Subsequently, heat transfer apparatus 144 produces a cooled raw syngas stream (not shown) that is channeled to scrubber and low temperature gas cooling (LTGC) unit 221 via syngas conduit 219. LTGC unit 221 is configured to remove particulate matter entrained within the raw syngas stream and facilitate removal of the removed particulate matter in a black water system (not shown) via conduit 222. LTGC unit 221 is also configured to further cool the raw syngas stream. Moreover, LTGC unit 221 is configured to convert at least a portion of COS in the raw syngas stream to $H_2S$ and $CO_2$ via hydrolysis.

Gasification system 200 further includes Gas Treating System (GTS) 300 that is coupled in flow communication with LTGC unit 221 and is configured to receive the cooled raw syngas stream via raw syngas conduit 220. GTS 300 is also configured to facilitate removal of at least a portion of sulfur-containing components, in particular $H_2S$ (not shown), from the raw syngas stream as discussed further below. GTS 300 is further configured to facilitate the removal of $CO_2$ from the synthesis gas via conduit 262. Moreover, in some embodiments, GTS 300 is coupled in flow communication with a sulfur removal unit (SRU) 400 via conduit 223 to treat the $H_2S$ removed from the syngas in system 300 and convert it to elemental sulfur stream 224. It should be understood that LTGC unit 221 is not necessary precursor to the proposed process, various high temperature acid gas removal schemes may operate without LTGC unit 221 or LTGC unit 221 may follow the acid gas removal.

In operation, air separation unit 202 receives air via air conduit 204. The air is separated into $O_2$, $N_2$ and other components. The other components are vented via a vent, the $N_2$ is channeled to gas turbine 114 via $N_2$ conduit 206 and the $O_2$ is channeled to gasifier 208 via $O_2$ conduit 210. Also, in operation, coal grinding and slurring unit 211 receives coal and water via conduits 212 and 213, respectively, forms a coal slurry stream and channels the coal slurry stream to gasifier 208 via coal slurry conduit 214.

Gasifier 208 receives the $O_2$ via $O_2$ conduit 210, coal via coal slurry conduit 214. Gasifier 208 facilitates production of a hot raw syngas stream that is channeled to heat transfer apparatus 144 via hot syngas conduit 218. The slag by-product that is formed in gasifier 208 is removed via slag handling unit 215 and conduits 216 and 217. Heat transfer apparatus 144 facilitates cooling the hot raw syngas stream to produce a cooled raw syngas stream that is channeled to scrubber and LTGC unit 221 via conduit 219 wherein particulate matter is removed from the syngas via black water system 222, the syngas is cooled further, and at least a portion of COS is converted to $H_2S$ and $CO_2$ via hydrolysis. The cool raw syngas stream is channeled to GTS 300 wherein acid gas components are substantially removed such that a clean syngas stream is formed and channeled to gas turbine 114 via clean syngas stream conduit 228.

Further, in operation, gas turbine 114 receives $N_2$ and clean syngas via conduits 206 and 228, respectively. Gas turbine 114 combusts the syngas fuel, produces hot combustion gases and channels the hot combustion gases to induce rotation of gas turbine 114 which subsequently rotates first electrical generator 118 via first rotor 120.

At least a portion of the heat removed from the hot syngas via heat transfer apparatus 144 and LTGC unit 221 is channeled as steam to HRSG 142 via conduit 146 wherein the heat superheats the steam. The steam is channeled to steam turbine 132 via steam conduit 150 and induces a rotation of steam turbine 132. Steam turbine 132 rotates second electrical generator 134.

Figure 2:
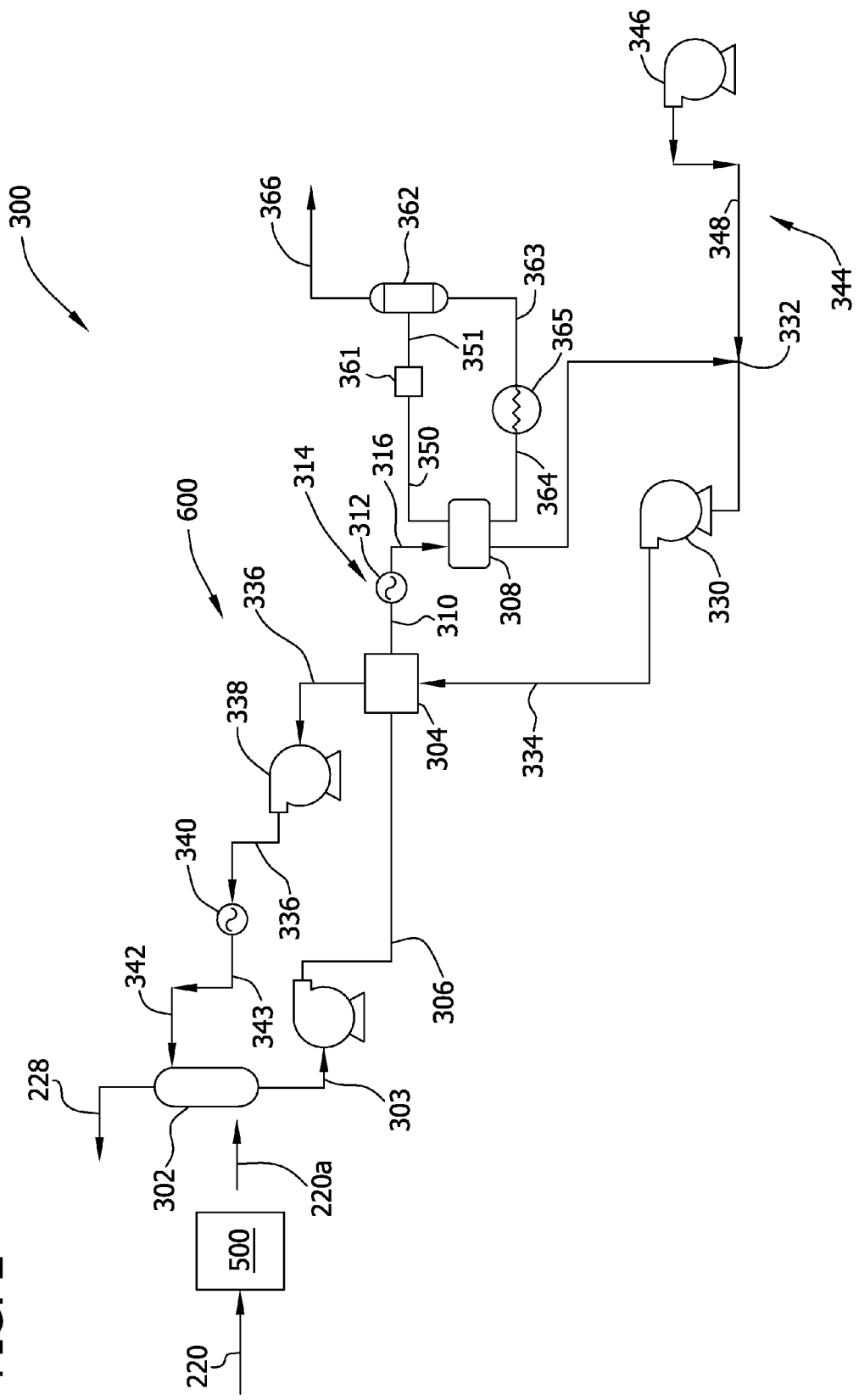
FIG. 2 is a schematic diagram of an exemplary High Pressure Gas Treating System (GTS) including a High Pressure Carbon Dioxice Removal (HPCDR) subsystem that can be used with the IGCC power generation plant shown in FIG. 1.
Figure 3:
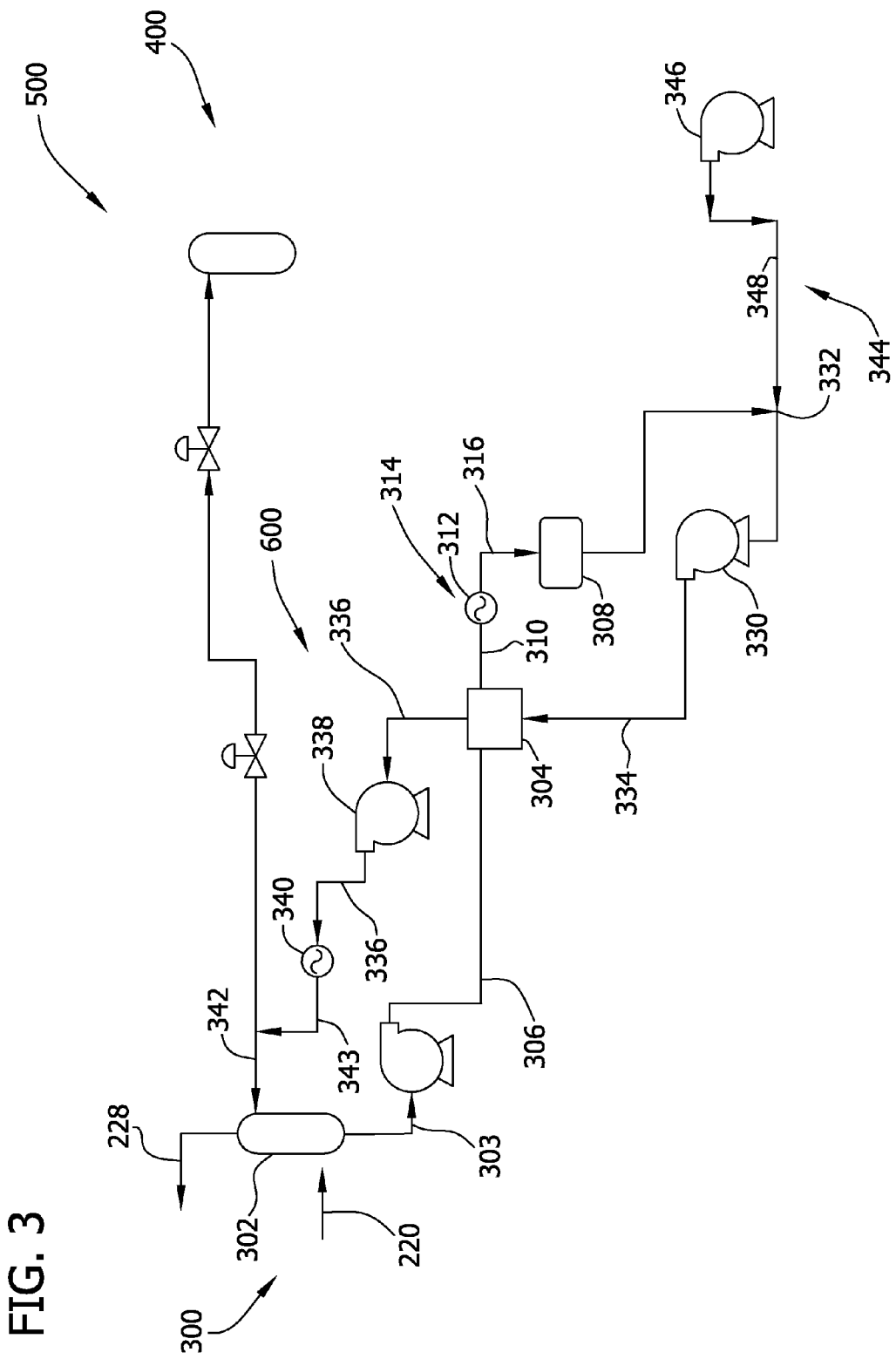
FIG. 3 is a schematic diagram of an alternative HPCDR subsystem coupled with an Acid Gas Removal System (AGR) that can be used with the IGCC power generation plant shown in FIG. 1.

FIG. 2 is a schematic diagram of exemplary GTS 300, which includes High Pressure Carbon Dioxide Removal (HPCDR) subsystem 600), that can be used with IGCC power generation plant 100 (shown in FIG. 1). Additionally, as shown in FIGS. 2 and 3, HPCDR subsystem 600 may be used in combination with a sulfur removal unit (SRU) 400 in the AGR system 500 of the gasification system. GTS subsystem 300 receives the raw syngas stream (not shown) via raw syngas stream conduit 220. HPCDR subsystem 600 channels the clean syngas stream (not shown) via conduit 228. In the exemplary embodiment (shown in FIG. 2), HPCDR subsystem 600 includes one main liquid gas contactor 302 coupled in flow communication with raw syngas stream conduit 220a, however, it should be recognized that the HPCDR subsystem 600 may include any number of liquid gas contactors to facilitate operation of HDCDR subsystem 600 as described herein without departing from the scope of the present disclosure.

Liquid gas contactor 302 may be a packed column, a trayed column, or a series of one or more liquid gas mixers and settlers connected either in series or in parallel.

In the exemplary embodiment, liquid gas contactor 302 comprises a solvent (not shown) to facilitate acid gas removal from the gas stream (i.e., raw syngas stream) to form an acid gas rich-solvent. While described herein as absorbing $CO_2$ from a synthesis gas, it should be understood that liquid gas contactor 302 comprising the solvent can absorb $CO_2$ from any pressurized gas stream comprising at least one of $N_2$, $CO_2$, $H_2S$, CO, $H_2$ sulfur-containing compound, and mixtures thereof, without departing from the scope of the present disclosure. Specifically, the raw syngas stream contacts at least a portion of an acid gas-lean amine solvent (not shown) to form a rich-solvent stream. The solvent for use in the present disclosure has high acid gas-absorption, particularly of $CO_2$ gas, at a low temperature and under the inlet pressure of the gas into liquid gas contactor 302. For gas containing from about 5 to over 60 volume percent $CO_2$, solvents have been identified that can absorb from about 0.8 moles of $CO_2$ per mole of solvent to about 1.1 moles of $CO_2$ per mole solvent at a temperature of from about −20° C. to about 35° C., and a total pressure of from about 100 kPa to a pressure in excess of about 15000 kPa, particularly a total pressure of from about 1000 kPa to about 8000 kPa. As used herein, the term "total pressure" refers to the pressure of the entire gasification system.

In one aspect, suitable solvents that have the above absorption properties include, for example, amine and amine derivative solvents such as triethanolamine (TEA), methyldiethanolamine (MDEA), monoethanolamine (MEA), diethanolamine (DEA), diglycolamine, diisopropanolamine, and derivatives and combinations thereof. Particularly preferred amine solvents are TEA, MEA, and MDEA. Specifically, it has been found that TEA can absorb from about 0.9 moles of $CO_2$ per mole of triethanolamine to about 1.0 moles of $CO_2$ per mole of triethanolamine at a temperature of about 25° C. and a partial pressure of from about 100 kPa to in excess of 3000 kPa. This facilitates the operation of the invention at total pressures of from about 4000 kPa to about 6000 kPa. When the TEA-rich solvent is heated to 120° C., the TEA solvent decreases to a $CO_2$ content of approximately 0.2 moles of $CO_2$ per mole of lean solvent. The lean solvent when cooled and contacted with the treated syngas can result in a gas concentration of significantly less than one percent $CO_2$.

In another aspect, the solvent is one or more physical solvents, or one or more alkaline materials that are other than amines.

In yet another aspect, the solvent is a mixture of amine and/or amine derivative solvents and physical solvents, such as described herein above.

Typically, liquid gas contactor 302 will also include a means (e.g., intercooler (not shown)) for the removal of the heat of absorption of the gas in the acid gas-rich solvent described below. The intercooler may either be integrated directly into liquid gas contactor 302 itself or connected externally to liquid gas contactor 302.

As shown in FIG. 2, main liquid gas contactor 302 is coupled in flow communication with a heating train that includes at least one heater 312 and at least one flash drum 308 via heat transfer apparatus 304 and first, second, and third rich solvent stream conduits 306, 310, and 316, respectively. While shown as having one heater 312 and one flash drum 308, it should be understood that the heating train may include more than one heater 312 and more than one flash drum 308 to enable the stage wise flashing of the solvent. In addition to the stage wise flashing, the flashing may be accomplished at different pressures for increased efficiency. For example, in one embodiment, the heating train may include heater 312 and first flash drum 308 and second flash drum (not shown).

The liquids from any multiple flashes may be fed back to liquid gas contactor 302 at different locations to provide for more optimal adsorption of the $CO_2$.

Typically, the acid gas rich-solvent is introduced into the heating train using any pressure intensification device known in the art. The pressure intensification device may be used to overcome system pressure drops or to increase the pressure of the flash to minimize compression of the flashed $CO_2$. For example, in one embodiment, as shown in FIG. 2, the acid gas rich-solvent may by introduced into the heating train via pump 303 and conduits 306 and 310.

Heat transfer apparatus 304 is configured to remove heat from at least a portion of the acid gas rich solvent stream, and conduit 306 is configured to channel the first acid gas rich solvent stream from main liquid gas contactor 302 to heat transfer apparatus 304. As discussed more fully below, hot lean solvent is also channeled to heat transfer apparatus 304 using pump 330, if necessary, and conduits 332 and 334.

Heat transfer apparatus 304 is coupled in flow communication with heater 312 via conduit 310. While heat transfer apparatus 304 is shown in FIG. 2 as having a single heater, it should be recognized by one skilled in the art that the heating train may include more than one heater, such as at least two heaters or at least three heaters, or even at least four heaters or more connected in parallel or series, without departing from the scope of the present disclosure. Once the acid gas rich solvent enters heater 312, the acid gas rich solvent is heated to an elevated temperature. More particularly, in one embodiment, the acid gas rich solvent is heated to a temperature of at least about 40° C., more suitably, a temperature of from about 80° C. to about 160° C., and even more suitably, a temperature of from about 120° C. to about 150° C. In one particularly preferred embodiment, heater 312 heats the acid gas rich solvent entering heater 312 using a low pressure steam 314 having a saturation pressure of from about 150 kPa to about 700 kPa.

Heater 312 is coupled in flow communication with flash drum 308 (sometimes referred to as a flash tank) via conduit 316. While shown in FIG. 2 as having a single flash drum, it should be recognized by one skilled in the art that the heating train may include more than one flash drum, such as at least two flash drums or at least three flash drums, or even at least four flash drums or more connected in parallel or in series, without departing from the scope of the present disclosure.

Flash drum 308 is configured to facilitate phase separation via flashing at least a portion of the $CO_2$ gaseous components within the first rich solvent stream to form a flash gas stream (not shown) and a hot lean solvent (not shown). Flash drum 308 typically flashes the heated acid gas rich-solvent at a temperature of from about 100° C. to about 130° C. and a total pressure of from about 100 kPa to a pressure in excess of about 15000 kPa, particularly, a total pressure of from about 1000 kPa to about 8000 kPa.

In one embodiment, one or more flash drum 308 may be a stripping column. A stripping column will provide improved mass transfer for the removal of the carbon dioxide from the solvent. The stripping column would contain typical commercial packing material, or multiple trays. A stripping gas (e.g., carbon dioxide or steam) may be provided to enhance transfer.

Flash drum 308 is again coupled in reverse flow communication with heat transfer apparatus 304 via at least one pump 330 (if needed) and conduits 332 and 334, wherein pump 330 and conduits 332 and 334 are configured to channel the hot lean solvent stream through heat transfer apparatus 304. Heat transfer apparatus 304 is configured to facilitate a transfer of heat from the hot lean solvent stream to the rich-solvent stream. Heat transfer apparatus 304 is coupled in flow communication with main liquid gas contactor 302 via a plurality of conduits 336, at least one pump 338 and a heat transfer apparatus 340. Conduits 336, pump 338 and heat transfer apparatus 340 are configured to channel a warm lean solvent stream (not shown) from heat transfer apparatus 304 and facilitate a removal of at least some of the heat within the warm solvent stream to form a cool lean solvent stream. Typically, the warm solvent stream is cooled in the heat transfer apparatus 144 to a temperature of from about 15° C. to about 45° C., More suitably, the warm solvent is cooled to a temperature of from about 25° C. to about 40° C. and even more suitably, to a temperature of about 25° C. A conduit 343 is configured to channel the cooled lean solvent stream from heat transfer apparatus 340 to main liquid gas contactor 302.

Pump 330 (when used) is also coupled in flow communication with a lean solvent makeup subsystem 344. Subsystem 344 includes a lean solvent source (not shown), a pump 346 (if required) coupled to the source, and, in the exemplary embodiment, a conduit 348 that is configured to channel a lean solvent stream to conduit 332 for use within HPCDR subsystem 600.

In operation, HPCDR subsystem 600 receives raw syngas via raw syngas stream conduit 220a. The raw syngas stream is channeled to main liquid gas contactor 302 wherein the raw syngas stream contacts at least a portion of the acid gas-lean solvent at a temperature of from about 15° C. to about 45° C. and under a pressure of from about 1000 kPa to about 15000 kPa to absorb $CO_2$ from the raw syngas stream to form an acid gas-rich solvent.

The removed acid gas components, including $CO_2$, are retained within the solvent thereby forming the acid-gas rich solvent stream. The rich solvent is channeled from main liquid gas contactor 302 via heat transfer apparatus 304 and conduit 306 to the heating train including at least one heater 312 and at least one flash drum 308, and lean solvent is channeled into main liquid gas contactor 302 via conduit 342. The rich solvent stream is heated to a temperature of about 40° C., more suitably from about 80° C. to about 160° C., and even more suitably, a temperature of from about 120° C. to about 150° C. In one embodiment, the rich solvent is heated in heater 312 and channeled to flash drum 308 via conduits 310 and 316. The heated acid gas rich solvent stream is flashed in drum 308 at a temperature of from about 100° C. to about 130° C. and system pressure (i.e., a pressure of from about 1000 kPa to about 8000 kPa such that a substantial portion of the entrained $CO_2$ is removed from the rich solvent to form a flash gas stream being rich in $CO_2$, and a hot lean solvent.

The hot lean solvent is channeled to heat transfer apparatus 304 as a hot lean solvent stream via pump 330 (when required) and conduits 332 and 334. Moreover, makeup lean solvent is channeled to the hot lean solvent stream via subsystem 344 and conduit 332. The hot lean solvent transfers heat to the rich solvent stream via apparatus 304 wherein the rich solvent stream is heated and the hot lean solvent stream is cooled to form a warm lean solvent stream. The warm lean solvent stream is channeled to heat transfer apparatus 340 via pump 338 (if needed) and conduit 336 wherein the warm lean solvent stream is cooled to form a cooled lean solvent stream that is recycled to main liquid gas contactor 302 via conduit 342 to replace the rich solvent channeled out of liquid gas contactor 302 as discussed above. Typically, the cooled lean solvent stream is cooled to a temperature of from about 10° C. to about 45° C. More suitably, the cooled lean solvent stream is cooled to a temperature of from about 15° C. to about 45° C., and even more suitably, about 25° C. The gas flashed from the solvent (also referred to herein as flash gas) in flash drum 308 is rich and contains $CO_2$, water, and potentially lesser amounts of the solvent. The flash gas is channeled through conduit 350 to cooler 361 then through conduit 351 to knock out drum 362 where condensed water and any residual solvent are removed. The water and residual solvent are channeled through conduits 363 and 364 back to an optimal place in the system, with possible heating in heater 365, typically, to flash drum 308. $CO_2$ stream 366 represents the product $CO_2$. Stream 366 is available for sequestration, pipelining, recycling in the gasification system, or any other subsequence application as known in the art. It is important to note that knock out drum 362 is at elevated pressure, which can be from the gasification system pressure or even higher pressures, which are determined by the properties of the solvent. As such, the need for compression of stream 366 is significantly reduced.

As depicted in FIG. 1, in one embodiment, the gasification system 200 further includes SRU 400 that can be used in combination with GTS subsystem 300 and HPCDR subsystem 600 in an AGR system 500 of an IGCC plant 100. Specifically, SRU 400 is coupled in flow communication with GTS subsystem 300.

Now referring to FIG. 3, AGR system 500 removes $H_2S$ and COS (when present) and channels clean syngas to HPCDR subsystem 600. A hydrolysis unit (not shown) is typically included in unit 221 to reduce the COS content in the raw syngas being fed to AGR system 500. Specifically, increasing the rate of conversion of COS to $H_2S$ and $CO_2$ is primarily accomplished by shifting the associated chemical reaction via decreasing the concentrations of the associated products. Sulfur Removal Unit (SRU) 400 facilitates mitigating a concentration of sulfur-containing species such as, but not limited to, $H_2S$ and COS in the raw and clean sygnas streams channeled through conduits.

The present disclosure also includes the possibility of eliminating AGR system 500 and SRU 400 from the process, allowing the synthesis gas to go directly to the HPCDR subsystem 600. The amines described herein in general, and TEA in particular, demonstrate the properties necessary for both $H_2S$ and $CO_2$ to be removed by the process described above. A $CO_2$ stream containing $H_2S$ will be produced, which can be further processed or utilized directly.

The present disclosure is illustrated by the following example which is merely for the purpose of illustration and is not to be regarded as limiting the scope of the disclosure or manner in which it may be practiced.

EXAMPLE

In this example, TEA was evaluated for its ability to absorb $CO_2$ from a raw syngas stream, substantially free from $H_2S$, under various temperature and pressure conditions that occur within a typical HPCDR subsystem of an IGCC plant.

Specifically, a raw syngas stream was channeled to a liquid gas contactor including an acid gas-lean triethanolamine (TEA) solvent. The raw syngas stream was first contacted with the acid gas-lean TEA solvent isothermally at a temperature of about 25° C. and under $CO_2$ partial pressures ranging from about 500 kPa to about 1800 kPa, represented by the area between B and C in FIG. 4. In order to maintain this temperature intercooling will be provided to the adsorber. The ability of the acid gas-lean TEA solvent to absorb the $CO_2$ under these pressures at 25° C. to form an acid gas-rich solvent was observed on the abscises of FIG. 4. Under these conditions, the solubility of $CO_2$ in the TEA is found to be in the range of from 0.9 to 1.0 moles $CO_2$ per mole of TEA. The syngas treated by this contactor will contain significantly less than one percent $CO_2$. For the purposes of this Example, the total pressure of the system is taken to be 6000 kPa.

The $CO_2$ rich stream is then transferred through one or more heaters to a temperature of 120° C., while maintaining the system at a pressure of 6000 kPa. This condition is represented by point D in FIG. 4. The solubility of $CO_2$ in the TEA solution is now found to be approximately 0.2 moles of $CO_2$ per mole of TEA. The effect is that we have "flashed" approximately 0.7 to 0.8 moles of $CO_2$ per mole of TEA. The flash gas (at 6000 kPa) is cooled and the condensed liquid (i.e., water and residual TEA) is returned to the system.

Figure 4:
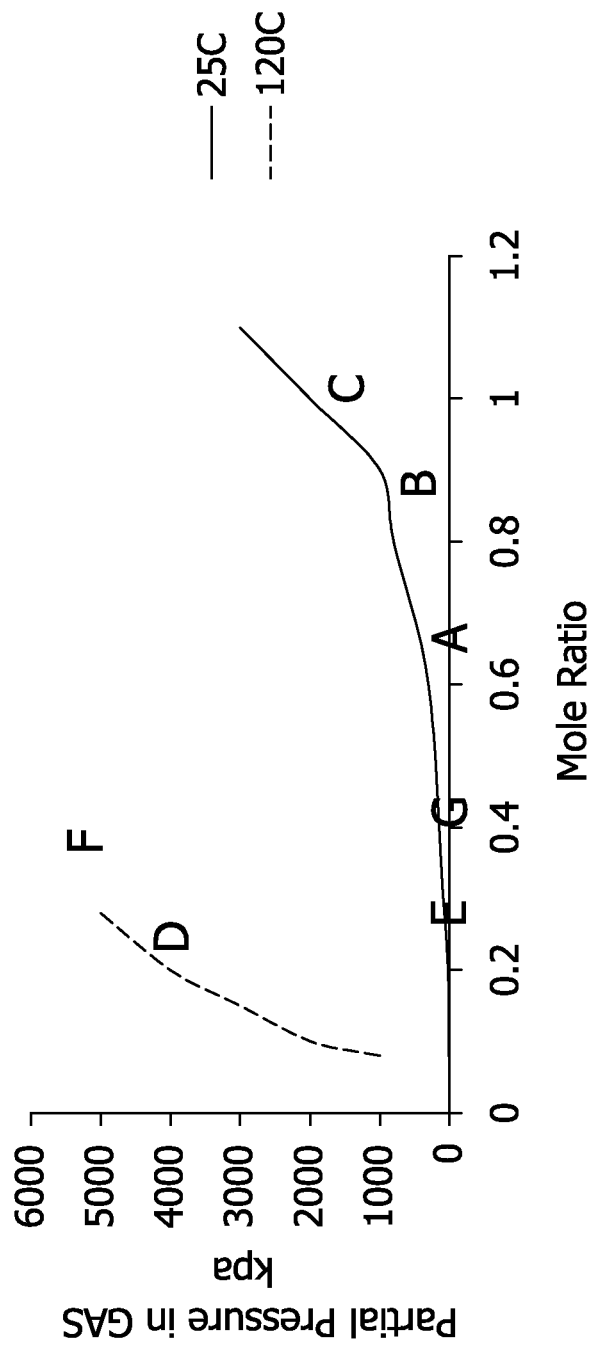
FIG. 4 is a graph depicting a triethanolamine solvent's capability to absorb $CO_2$ under the various temperature and pressure conditions as described in the Example.

The solvent is then cooled to 25° C. represented by point E in FIG. 4, and returned to the liquid gas contactor.

In the way of enhancement, the pressure of the rich TEA from the contactor can be pumped to a higher pressure (e.g., point F in FIG. 4) with the flash gas now being recovered at a higher pressure than system pressure.

When introducing elements of the present disclosure or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the disclosure, it is intended that all matter contained in the above description and shown in the accompanying drawings shall be interpreted as illustrative and not in a limiting sense.

What is claimed is:

1. A method of removing carbon dioxide from a gas stream, the method comprising:
    absorbing carbon dioxide from the gas stream using a solvent in a liquid gas contactor to form an acid gas rich-solvent, the solvent being capable of absorbing carbon dioxide at a low temperature and an inlet pressure of the gas stream into the liquid gas contactor;
    introducing the acid gas rich solvent into a heating train that includes at least one flash drum coupled in reverse flow communication with at least one heat transfer apparatus and heating the acid gas rich solvent using a low pressure steam having a saturation pressure of between about 150 kPa to about 700 kPa;

flashing the heated acid gas rich-solvent to form a flash gas stream and a hot lean solvent, wherein the flash gas stream is rich in carbon dioxide;

cooling the hot lean solvent to form a cooled lean solvent;

recycling the cooled lean solvent into the liquid gas contactor;

removing at least one of water and residual solvent from the flash gas stream; and channeling at least one of the water and the residual solvent to at least one flash drum coupled in the heating train.

2. The method as set forth in claim 1 wherein absorbing carbon dioxide from the gas stream comprises absorbing carbon dioxide from the gas stream comprising at least one of carbon dioxide, hydrogen sulfide, carbon monoxide, sulfur-containing compound, and mixtures thereof.

3. The method as set forth in claim 1 wherein absorbing carbon dioxide from the gas stream comprises absorbing the carbon dioxide using the solvent selected from an amine or an amine derivative, wherein the amine or amine derivative is selected from the group consisting of triethanolamine, methyldiethanolamine, monoethanolamine, diethanolamine, diglycolamine, diisopropanolamine, and derivatives and combinations thereof.

4. The method as set forth in claim 1 wherein absorbing carbon dioxide from the gas stream comprises absorbing the carbon dioxide in a liquid gas contactor selected from the group consisting of a trayed column, a packed column, and at least one liquid gas mixer connected to a settler.

5. The method as set forth in claim 1 further comprising channeling the heated acid rich-solvent through the at least one heat transfer apparatus via at least one pump and at least two conduits.

6. The method as set forth in claim 1 wherein heating the acid gas rich solvent using a low pressure steam comprises heating the acid gas rich solvent using a heater comprising the low pressure steam having a temperature of from about 120° C. to about 150° C.

7. The method as set forth in claim 1 wherein absorbing carbon dioxide comprises absorbing carbon dioxide at a temperature of from about −20° C. to about 35° C. and a total pressure of from about 1000 kPa to about 15000 kPa.

8. The method as set forth in claim 1 wherein flashing the heated acid gas rich-solvent to form a flash gas stream comprises flashing at a temperature of from about 100° C. to about 130° C. and a total pressure of from about 1000 kPa to about 15000 kPa.

9. A method of removing carbon dioxide and hydrogen sulfide from a gas stream, the method comprising:

absorbing carbon dioxide and hydrogen sulfide from the gas stream using a solvent in a liquid gas contactor to form an acid gas rich solvent, the solvent being capable of absorbing carbon dioxide at a low temperature and an inlet pressure of the gas stream into the liquid gas contactor;

introducing the acid gas rich solvent into a heating train that includes at least one flash drum coupled in reverse flow communication with at least one heat transfer apparatus and heating the acid gas rich-solvent using a low pressure steam having a saturation pressure of between about 150 kPa to about 700 kPa;

flashing the heated acid gas rich-solvent to form a flash gas stream and a hot lean solvent, wherein the flash gas stream is rich in carbon dioxide and hydrogen sulfide;

cooling the hot lean solvent to form a cooled lean solvent; and recycling the cooled lean solvent back into the liquid gas contactor;

removing at least one of water and residual solvent from the flash gas stream; and channeling at least one of the water and the residual solvent to at least one flash drum coupled in the heating train.

10. The method as set forth in claim 9 wherein absorbing carbon dioxide and hydrogen sulfide from the gas stream comprises absorbing carbon dioxide and hydrogen sulfide from the gas stream comprising at least one of carbon dioxide, hydrogen sulfide, carbon monoxide, sulfur-containing compound, and mixtures thereof.

11. The method as set forth in claim 9 wherein absorbing carbon dioxide and hydrogen sulfide from the gas stream comprises absorbing the carbon dioxide and hydrogen sulfide using the solvent selected from an amine or an amine derivative, wherein the amine or amine derivative is selected from the group consisting of triethanolamine, methyldiethanolamine, monoethanolamine, diethanolamine, diglycolamine, diisopropanolamine, and derivatives and combinations thereof.

12. The method as set forth in claim 9 wherein absorbing carbon dioxide and hydrogen sulfide from the gas stream comprises absorbing the carbon dioxide and hydrogen sulfide in a liquid gas contactor selected from the group consisting of a trayed column, a packed column, and at least one liquid gas mixer connected to a settler.

13. The method as set forth in claim 9 wherein heating the acid gas rich solvent comprises heating the acid gas rich solvent using a heater to heat the low pressure steam to a temperature of between about 120° C. to about 150° C.

14. The method as set forth in claim 9 wherein absorbing carbon dioxide and hydrogen sulfide comprises absorbing carbon dioxide and hydrogen sulfide at a temperature of from about −20° C. to about 35° C. and a total pressure of from about 1000 kPa to about 15000 kPa.

15. The method as set forth in claim 9 wherein flashing the heated acid gas rich-solvent to form a flash gas stream comprises flashing at a temperature of from about 100° C. to about 130° C. and a total pressure of from about 1000 kPa to about 15000 kPa.

16. The method as set forth in claim 9 wherein cooling the solvent comprises cooling the solvent to a temperature of from about 15° C. to about 45° C.

* * * * *